United States Patent Office 3,501,620
Patented Mar. 17, 1970

3,501,620
APPARATUS FOR THAWING DEEP-FROZEN FOOD
Paul Sauer, Burg, Dillkreis, Germany, assignor to Burger Eisenwerke Aktiengesellschaft, Burg, Dillkreis, Germany, a corporation of Germany
Continuation-in-part of application Ser. No. 482,385, Aug. 25, 1965. This application Dec. 23, 1968, Ser. No. 786,334
Claims priority, application Germany, Sept. 5, 1964, B 78,425
Int. Cl. A21b 1/00, 1/22; F27d 11/00
U.S. Cl. 219—400                          9 Claims

ABSTRACT OF THE DISCLOSURE

Apparatus for thawing deep-frozen food is provided with control means for controlling a sequence of thawing temperatures for the food. A first temperature control means sets a relatively high temperature for heated air or gas that is circulated past the frozen food in a chamber, and a second temperature control means sets a lower temperature for the heated air or gas during a final phase of thawing of the food. The first temperature is within the range of 200–250° C., and the second temperature is within the range of 100–150° C.

CROSS-REFERENCES TO RELATED APPLICATIONS

This application is a continuation-in-part application of my copending patent application Ser. No. 482,385, filed Aug. 25, 1965. Also, this application is related to, and includes subject matter from, my copending application Ser. No. 551,564, filed May 20, 1966.

BRIEF DESCRIPTION OF INVENTION

This invention relates to apparatus for thawing deep-frozen foods such as boiled, roasted, or baked foods which are frozen in dishes or other containers. Also, a method of using the apparatus will be described.

It is known in this art to thaw frozen foods by circulating heated air past the frozen food in a chamber. However, even though it is possible to thaw foods in this manner without impairing flavor characteristics and other qualities, it does take a considerable length of time to effect such thawing by known methods and with known apparatus. It has been a problem in this art to shorten thawing time, and it is not satisfactory to merely increase the hot air temperature of circulated air because if this is done the foods have a tendency to dry out too much or even to become scorched. Also, it is known to increase the supply of heat to thawing food by simply adding steam to hot air being circulated around the food, but this method has the disadvantage of allowing water of condensation to precipitate on the food container in such a way that it may affect the food or create problems in connection with the operation of the apparatus. Thus, it has not been thought possible to utilize very high air or gas temperatures for thawing deep-frozen foods without seriously affecting the quality of the food material, and there has been a real limit as to how much thawing time can be reduced.

In accordance with the present invention, a substantial reduction in thawing time is obtained by apparatus which supplies heated air, or gas, to a thawing chamber at a relatively high temperature at the commencement of a thawing operation and at a much lower temperature towards the end of the thawing operation. Control means are provided for dictating a sequence of temperatures for the initial and final thawing operations.

In one embodiment of the invention, food is placed in a thawing chamber, and relatively hot air is circulated around the food by a fan or other circulation means. The temperature of the air is controlled so that during initial thawing it is in the range of approximately 200–250° C. The initial phase of thawing is continued until the melting point (the point at which water contained in the frozen food reaches approximately 0° C.) is reached in the thawing food, and then, a much lower temperature is dictated by control devices of the apparatus to lower the temperature of circulating air or gas during a final phase of thawing. The lower temperature for the air or gas is within the range of 100–150° C. Thus, in contrast to prior art methods and devices, the present invention contemplates the use of very high initial thawing temperatures, followed by a substantial reduction in temperature during a final phase of thawing after the melting point of the food has been reached. As a result, there is a real reduction in thawing time for any given deep-frozen food, and there is no adverse affect upon the food itself or its flavor characteristics.

It can be appreciated that the precise temperatures of hot air or gas during the two phases of thawing depend largely upon the nature of the foods which are being treated. However, with many known foods, it has been found that a control of initial air temperature to about 210° C., followed by a lowering of the air temperature to 130° C. for final thawing, is advantageous. In the specific embodiment of the invention which will be discussed below, two thermostats will be described as a part of the control and sequencing means for carrying out the thawing operation of this invention.

It will be appreciated by those skilled in this art that the invention can be modified in various ways to accommodate the apparatus to various thawing operations. It is possible, for example, to provide means to add steam to the hot air during the initial thawing phase in order to improve the transfer of heat, and when this is done it is preferred that only hot air (without steam) be utilized during the final thawing phase so as to avoid any formation of water of condensation.

These and other advantages of the present invention will become apparent in the more detailed discussion which follows, and in that discussion reference will be made to the accompanying drawings as briefly described below.

DETAILED DESCRIPTION OF INVENTION

Figure 1:
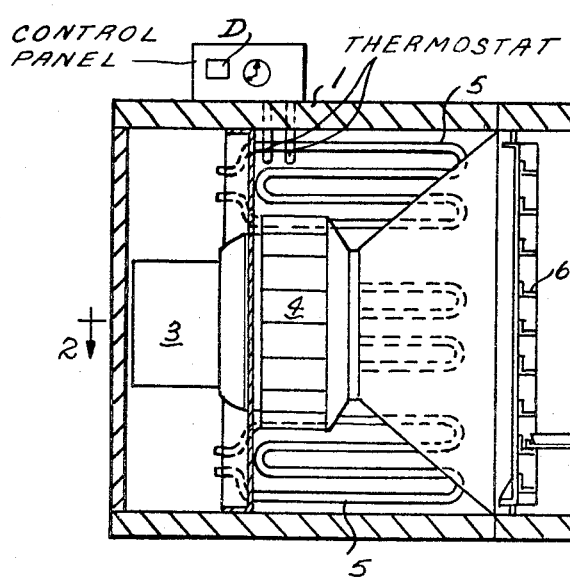
FIGURE 1 is an elevational cross sectional view of one form of thawing oven which may utilize the features of the present invention.
Figure 2:
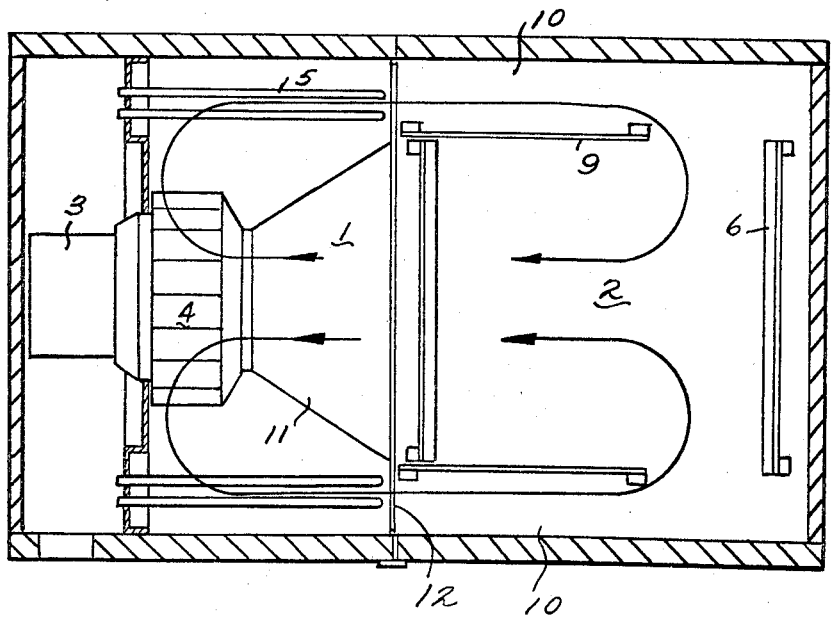
FIGURE 2 is a horizontal sectional view of the thawing oven of FIGURE 1, as seen on line 2—2 of FIGURE 1.

Referring to FIGURES 1 and 2, a typical apparatus for thawing foods is illustrated. This apparatus is of the type described in my copending application Ser. No. 551,564, but it is to be understood that other forms of thawing ovens and thawing chambers may be used in the practice of this invention. In the illustrated embodiment, the thawing oven is made up of two units which are constructionally separate from one another, and the two units include an installation compartment or cell 1 and a thawing chamber or oven 2. The installation compartment contains all major operating equipment for the apparatus so that the operating equipment can be installed and maintained easily. The operating equipment includes a fan motor 3 connected to a conventional source of power for driving a fan impeller 4. The fan impeller 4 circulates air, or other gas, past electrical heating elements 5 which are arranged around the fan housing. Also, the installation compartment 1 includes a control panel which is labelled in the drawing, and the control devices include a timer, thermostats, and switching relays, all of which are shown in greater detail in FIGURE 3.

The thawing chamber 2 comprises a separate compartment which can be placed adjacent to the installation cell so that heated air can be circulated around food contained within the thawing chamber 2. Arranged in the thawing chamber 2 are racks 6 which function to carry grids 8 for supporting food containers 7. Also, baffle plates 9 may be installed in the thawing chamber to direct a flow of heated air throughout all portions of the chamber. As shown in FIGURE 2, heated air or gas is circulated by the fan 4 in the manner indicated by the arrows, and the heated air flows between tiers of food-supporting grids contained within the thawing chamber 2. The air is heated by the heating elements 5, and then it flows through a lateral air duct 10. From there, the heated air or gas flows between tiers of food within the thawing chamber and back into a funnel-shaped baffle plate 11 which forms a communication between the fan 4 and the thawing chamber 2. The flow of air through the funnel 11 returns air to the fan impeller 4 and completes the circulation of air within the apparatus. Since the installation compartment 1 and thawing chamber 2 are constructionally separate units, it is possible to stack such units or to arrange them adjacent to one another, all as described in my copending application Ser. No. 551,564. A joint 12 between the installation compartment 1 and the thawing chamber 2 is provided with means for forming a tight seal when the two units are brought together, and any suitable door or entry means may be provided for opening and closing the thawing chamber 2.

Figure 3:
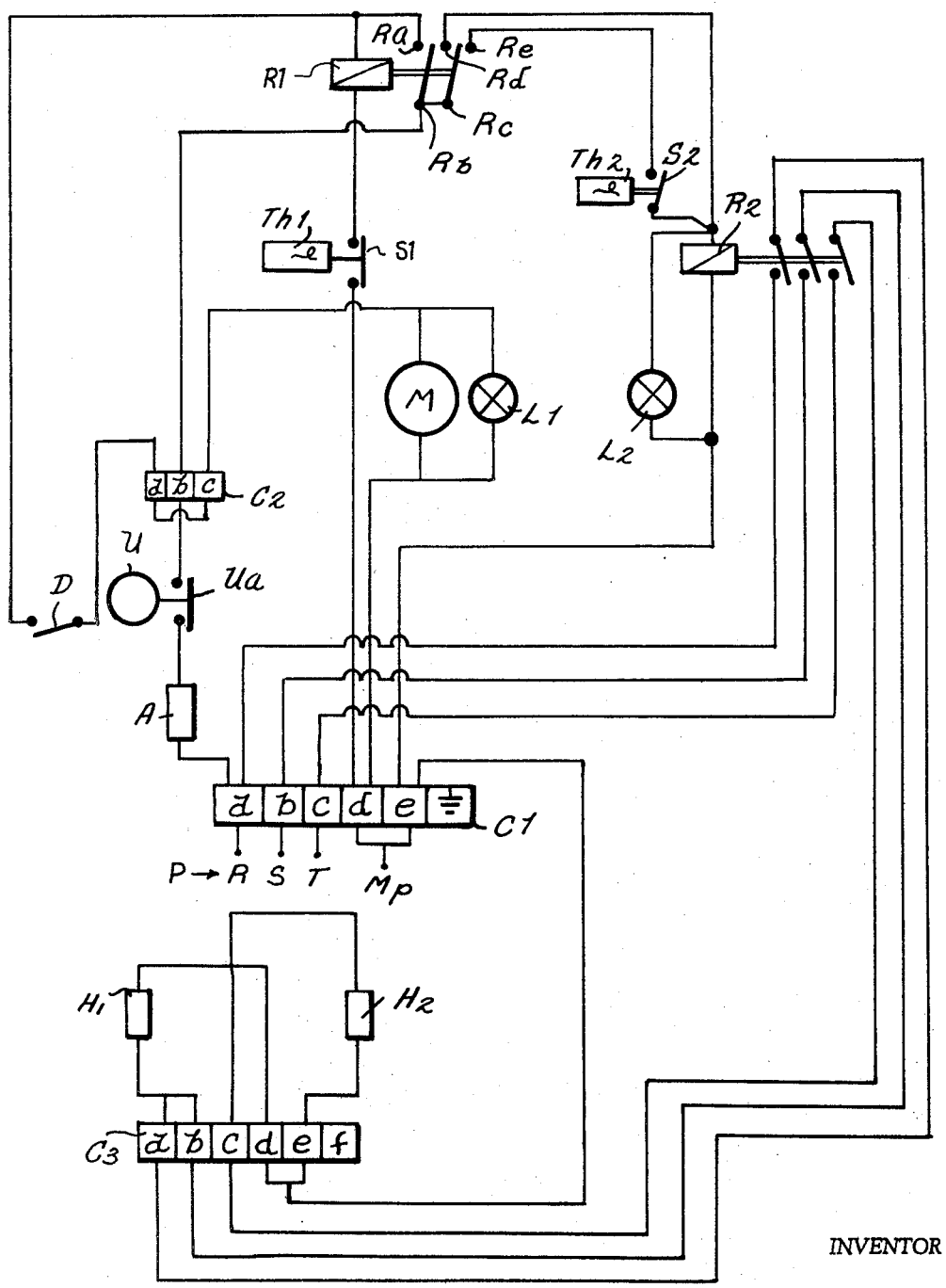
FIGURE 3 is a diagrammatic view of control means associated with the apparatus of this invention.

FIGURE 3 illustrates control functions associated with the apparatus of this invention. As indicated above, the invention provides for an improved combination of controls so that deep-frozen food can be thawed in a substantially reduced period of time without affecting the quality of the food. This is accomplished by treating deep-frozen food with a relatively high temperature of heated air or gas during an initial phase of thawing, and such treatment is continued until the melting point of the food is reached. Once the melting point is reached, control means provide for a relatively rapid and substantial reduction in temperature of heated air or gas for a final phase of thawing. The initial phase of thawing is carried out at a relatively high temperature in the range of 200–250° C., and the second phase of thawing may be carried out at temperatures in the lower range of 100–150° C. Means for controlling the sequencing of the thawing operation and for limiting thawing temperatures during the two phases that are provided by this invention are shown in FIGURE 3. A typical control includes a terminal block $C_1$ connected to a three phase and neutral power source P. Also, the terminal block $C_1$ carries the terminals labelled $a$ through $e$. The terminal 1 is connected, through a resistor A and the contacts $U_a$ of a time switch U for controlling the duration of the thawing operation, to a further terminal block $C_2$. The terminal block $C_2$ has three terminals labelled $a$, $b$ and $c$, which are all interconnected. The terminal $a$ is connected, through a manually operated key D, to the coil of a relay $R_1$ and also to a contact $R_a$ of this relay, the terminal $b$ is connected to contacts $R_b$ and $R_c$ of relay $R_1$, and the terminal $c$ is connected to a motor M (which may be motor 3 of FIGURES 1 and 2) for driving a fan 4 which is arranged to direct air over the food to be thawed. The motor is also connected to the neutral terminal $d$ of the terminal block $C_1$. A lamp $L_1$ is connected across the terminals of the motor M. The contacts $S_1$ of a thermostat $Th_1$, which is set to the higher air temperature, are connected between the coil of relay $R_1$ and the terminal $d$ of the terminal block $C_1$.

The relay $R_1$ includes a further contact $R_d$ connected directly to the coil of a second relay $R_2$ and another contact $R_e$ also connected to the coil of relay $R_2$ but through the contacts $S_2$ of a second thermostat $Th_2$ which is set to the lower air temperature. Relay $R_2$ has an indicator lamp $L_2$ connected thereacross. The contacts of relay $R_2$ are arranged to connect the terminals $a$, $b$ and $c$ of the terminal block $C_1$ to terminals $a$, $b$ and $c$ respectively of a third terminal block $C_3$. Terminals $d$ and $e$ of the terminal block $C_3$ are connected to the terminal $e$ of the terminal block $C_1$. Heating means $H_1$ and $H_2$ (which may be in the form of elements 5 of FIGURES 1 and 2) are connected across terminals $b$ and $d$, and terminals $c$ and $e$ respectively of the terminal block $C_3$.

The operation of the arrangement will now be described.

When the thawing chamber has been charged, the time switch U is set to the required thawing time thereby closing the contacts $U_a$, as a result of which the fan motor M is switched on. By pressing the key D, the relay $R_1$ is pulled in thereby supplying the relay $R_2$ with current through terminals $R_c$ and $R_d$, whereby the heating means $H_1$ and $H_2$ are brought into action. The current path through the contacts $R_b$ and $R_a$ holds the relay in following release of key D.

As soon as the hot air has reached a predetermined temperature e.g. 130° C., to which the thermostat $Th_2$ is set, it opens its contacts $S_2$. However, this has no influence on the heating means, since the relay $R_2$ is still supplied with current through contacts $U_a$, terminal bar $C_2$ and contacts $R_c$ and $R_d$ of relay $R_1$. Only when the higher temperature, of for example 210° C., is reached does the thermostat $Th_1$ open, causing the relay $R_1$ to drop out, as a result of which the relay $R_2$ is connected in series with the contacts $S_2$, through terminals $R_c$ and $R_e$ of relay $R_1$ (terminals $R_b$ and $R_d$ not being connected together). The thermostat $Th_2$, which is set to the lower temperature, now takes over the supervision of the heating means to monitor the air temperature, and ensures that the hot air temperature falls and that the required temperature is thereafter not exceeded. It can be appreciated that the high temperature will drop relatively rapidly once the heating is switched off since there is a considerable temperature difference between the temperature of the food and of the circulating air.

After the time set on the time-switch U has expired, contacts $U_a$ are opened, to switch off the motor M, and to deenergize relay $R_2$, thereby cutting off the heating means.

The above described embodiment constitutes a relatively simple arrangement, and it can be appreciated that the described automatic sequencing of heating control from a relatively high temperature to a relatively low temperature is intended to satisfy many thawing situations wherein deep-frozen food has reached its melt point by the time the thermostat $Th_1$ is opened. In more complex embodiments and arrangements wherein it is desired to maintain a close control over the period of time of initial thawing, as compared to final thawing, it is preferred that a timing means be included to maintain the thermostat $Th_1$ in operative condition for a preset period of time before allowing a switch-over to thermostat $Th_2$ for controlling a lower temperature range. Obviously, control for the entire thawing operation can be effected by other equivalent means such as a program control device which can be adjusted or set in accordance with the type and weight of food to be thawed. Such a control arrangement could be designed to be operated by push buttons which are manually pressed to set selected periods of time for initial and final thawing, as desired for a particular thawing operation.

What is claimed is:

1. In apparatus for thawing deep-frozen food, said apparatus being of the type having a chamber defined by a closed housing which contains the deep-frozen food to be thawed, and including heating means and circulating means within said housing for circulating heated air or gas through the chamber, the improvement comprising:

electrical control means operatively connected to the heating means to control a sequence of temperatures for the air or gas which is circulated through the food chamber of the apparatus, said control means having a first temperature control means which sets and maintains operation of said heating means for a relatively high temperature of heated air or gas during an initial phase of thawing the frozen food, and a second temperature control means which sets and maintains operation of said heating means for a lower temperature of heated air or gas during a final phase of thawing the frozen food, and sequencing means in circuit with said electrical control means for limiting the effect of said first temperature control means to an initial period of thawing time and for causing the second temperature control means to become effective during a final period of time which begins when the melting point of the food is reached.

2. The improvement of claim 1 wherein said first and second temperature control means include separate thermostats for limiting the heating of air or gas during said initial and final phases of thawing.

3. The improvement of claim 1 in which the electrical control means includes a first temperature responsive thermostat which is set to said relatively high temperature, and a second temperature responsive thermostat which is set to said lower temperature, and including means for rendering inoperative the second thermostat until said relatively high temperature is reached.

4. The improvement of claim 3 wherein said first temperature responsive thermostat dictates a relatively high temperature of 200–250° C. during the initial phase of thawing.

5. The improvement of claim 3 wherein said second temperature responsive thermostat dictates a temperature in the range of 100–150° C. during said final phase of thawing.

6. The improvement of claim 1 wherein said sequencing means includes a timing means for controlling the duration of the thawing operation.

7. The improvement of claim 1 and including a program control device for controlling the duration of the thawing operation.

8. The improvement of claim 1 further including a selector switch for adapting the duration of the thawing operation to the type and weight of the food to be thawed.

9. In apparatus for thawing deep-frozen food, said apparatus being of the type having a chamber defined by a closed housing which contains the deep-frozen food to be thawed, and including heating means and circulating means within said housing for circulating heated air or gas through the chamber, the improvement comprising:

electrical control means operatively connected to the heating means of said apparatus to control a sequence of temperatures for the air or gas which is circulated through the food chamber of the apparatus, said control means having a first temperature control means which sets and maintains operation of said heating means to heat the air or gas to a temperature within the range of 200–250° C. during an initial phase of thawing of the frozen food, and a second temperature control means which sets and maintains operation of said heating means to heat the air or gas to a temperature within the range of 100–150° C. during a final phase of thawing of the frozen food.

References Cited

UNITED STATES PATENTS

| | | | |
|---|---|---|---|
| 2,491,420 | 12/1949 | Scott | 219—400 |
| 2,906,620 | 9/1959 | June | 219—400 X |
| 3,261,343 | 7/1966 | Tibell | 126—21 |
| 3,265,861 | 8/1966 | Perlman | 219—399 |
| 3,368,062 | 2/1968 | Gramenius | 219—400 |

VOLODYMYR Y. MAYEWSKY, Primary Examiner

U.S. Cl. X.R.

99—234; 126—21; 219—374